June 22, 1965  D. L. WARD ETAL  3,190,636
SOFT TOP SEAT

Filed April 12, 1963  3 Sheets-Sheet 3

DONALD L. WARD
ALAN P. EFFENY
INVENTORS

BY John A. Faulkner
John J. Roethel

ATTORNEYS

United States Patent Office 3,190,636
Patented June 22, 1965

3,190,636
SOFT TOP SEAT
Donald L. Ward, Hornchurch, and Alan P. Effeny, Upminster, England, assignors to Ford Motor Company, Dearborn, Mich., a corporation of Delaware
Filed Apr. 12, 1963, Ser. No. 272,757
3 Claims. (Cl. 267—107)

This invention relates to motor vehicle passenger seats.

When a vehicle is subjected to rapid deceleration, the rear seat passengers may be flung forwardly against the rigid top of the rearwardly extending main frame of the front seat. Some front seats have additional padding at the top to minimize the impact to the rear seat passengers. This padding does not, however, always reduce the impact adequately.

In a motor vehicle passenger seat, according to the present invention, the seat back has an upstanding substantially rigid main frame; a rear border wire which is secured to the main frame and a portion of which projects upwardly from the top of the main frame; a front border wire the upper part of which is located above the level of the top of the main frame; and springs which extend in the fore and aft direction of the seat and which connect the front border wire to the upwardly projecting portion of the rear border wire.

When a vehicle fitted with such a seat is involved in a crash, a rear seat passenger striking the top of the seat back causes the upwardly projecting portion of the rear border wire to be deflected forwardly thereby reducing the shock to the passenger.

As compared with conventional seat backs, the top edge of the main frame is lower than usual and the distance through which the rear border wire projects upwardly from the main frame is preferably such that the combined height of the main frame and the upwardly projecting portion is the same as the height of the rigid frame of a conventional seat back.

The main frame is preferably of an inverted U-shape.

The invention is hereinafter particularly described with reference to the accompanying drawings in which.

Figure 1:
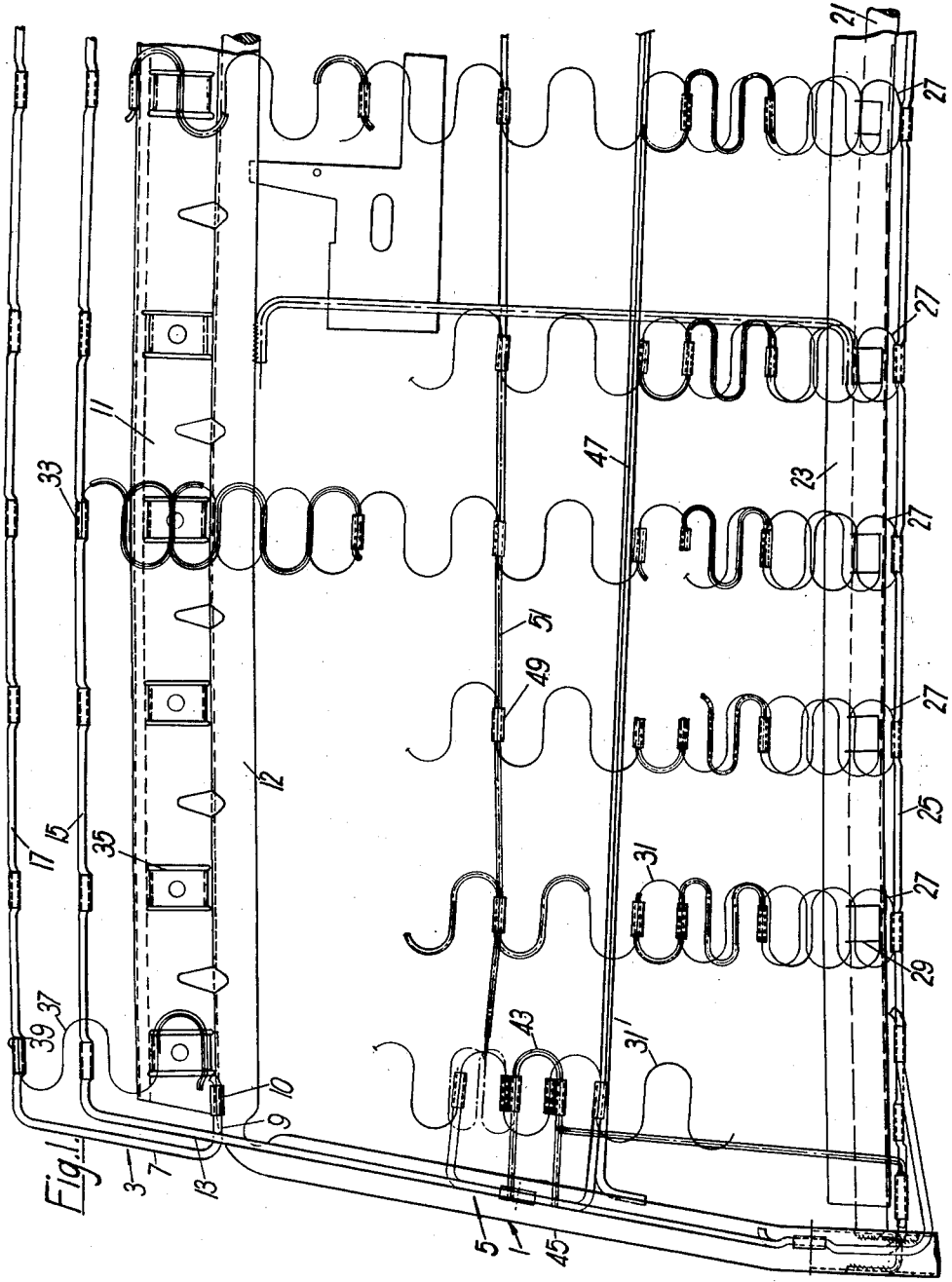
FIG. 1 shows part of the interior construction of the seat back of a motor vehicle bench type front passenger seat.
Figure 2:
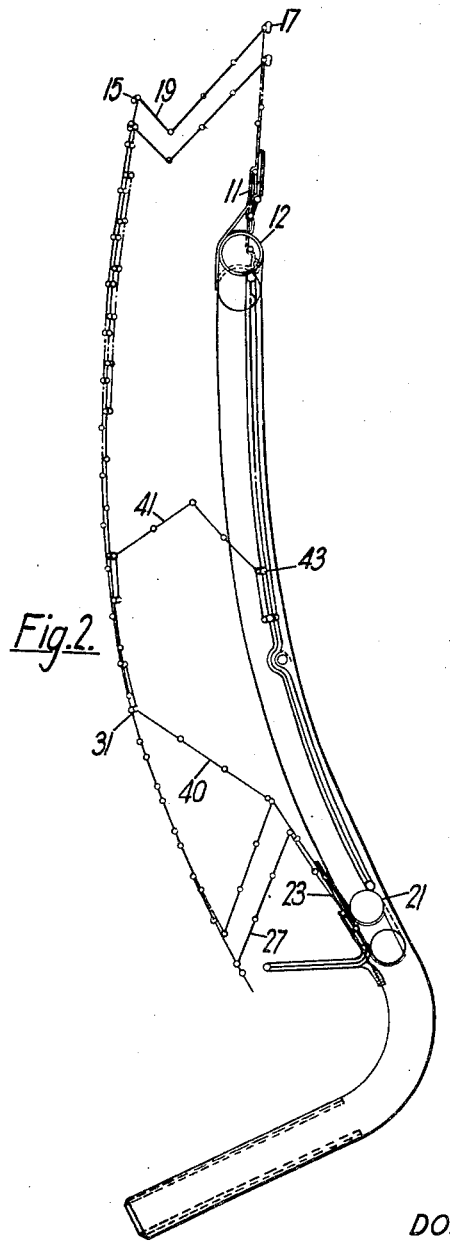
FIG. 2 is a complete diagram showing two superimposed vertical sections through the seat back.
Figure 3:
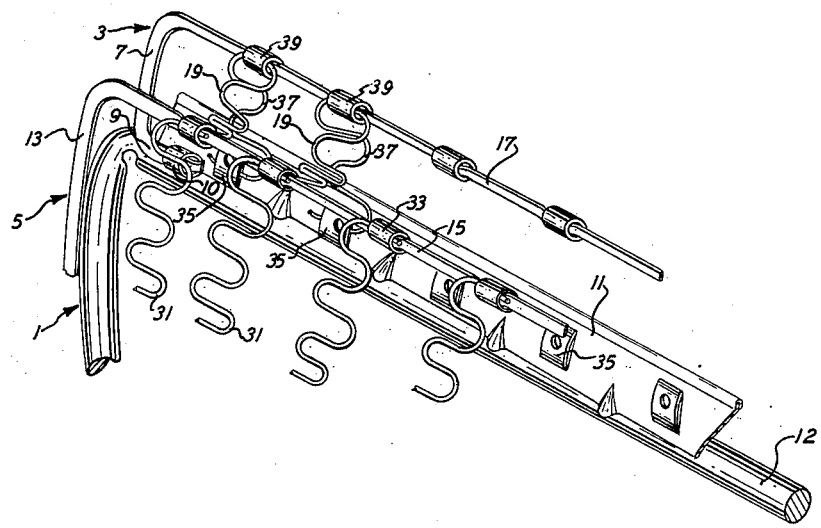
FIG. 3 is a fragmentary perspective view illustrating the upper portion of the seat back as it embodies the present invention.

The seat back has an upstanding inverted U-shaped tubular steel main frame 1, a rear border wire 3 and a front border wire 5. The rear border wire 3 has a portion 7 which projects upwardly from the main frame 1 and which has inwardly extending end portions 9 secured within lips 10 integral with an upper spring landing plate 11 spot welded to the transverse portion 12 of the main frame 1.

The upper part 13 of the front border wire 5 is located above the level of the transverse portion 12 of the main frame 1 and has its transverse portion 15 connected to the transverse portion 17 of the rear border wire 3 by laterally spaced apart fish mouth springs 19.

The main frame 1 has a lower transverse tubular member 21 on which is spot welded a lower spring landing plate 23 and the lower transverse portion 25 of the front border wire is connected to the spring landing plate 23 by laterally spaced apart fish mouth springs 27.

The lower spring landing plate 23 has laterally spaced lancings 29 within which are secured the lower ends of laterally spaced sinuous wire crown springs 31 the upper ends of which are secured by clips 33 to the upper transverse portion 15 of the front border wire 5.

The upper spring landing plate 11 has laterally spaced lancings 35 within which are secured the lower ends of laterally sinuous wire springs 37 the upper ends of which are secured by clips 39, to the transverse portion 17 of the rear border wire 3.

Laterally sinuous wire spring helpers 40 connect the fish mouth springs 27 to their correspondingly located crown springs 31 and a pair of fish mouth spring helpers 41 are respectively secured to brackets 43 one on each side member 45 of the main frame 1 and to the two outermost crown springs 31. A trim retaining rod 47 is secured at its ends to the side members 45 of the main frame and the crown springs 31 are connected by clips 49 to a coiled curtain wire 51.

In the event that a passenger in the rear vehicle seat is thrown forwardly, for example during a crash, the impact of the passenger on the transverse portion 17 of the rear border wire 3 causes the fish mouth springs 19 to flex forwardly thereby reducing the shock to the passenger.

It will be understood that the invention is not to be limited to the exact construction shown and described, but that various changes and modifications may be made without departing from the spirit and scope of the invention, as defined in the appended claims.

We claim:

1. In a motor vehicle passenger seat,
a seat back having an upstanding substantially rigid main frame,
said main frame having an upper transverse member extending across the width of said seat back,
a rear border wire secured to and extending upwardly from said main frame in substantially coplanar relationship thereto and having a transverse element extending in substantially parallel spaced relationship to and above said upper transverse member,
a front border wire having a substantially horizontally extending element paralleling said upper transverse member and said rear border wire transverse element at a height therebetween,
said front border wire lying forwardly of said main frame,
and spring elements extending fore and aft of the seat and coupled to said rear border wire transverse element and said horizontally extending element,
said rear border wire transverse element being resiliently deflectable about the longitudinal axis of said main frame upper transverse member toward said front border wire horizontally extending element under substantially forwardly directed force applied to the top of said seat.

2. In a seat according to claim 1 in which the spring elements extending between said rear border wire transverse element and said front border horizontally extending element are fish mouth springs.

3. In a seat according to claim 2 in which the apexes of the fish mouth springs are below said rear border wire transverse element and said front border wire horizontally extending element whereby, as the fish mouth springs are compressed as said rear border wire transverse element deflects toward said front border wire horizontally extending element, said apexes move deeper into said seat back.

References Cited by the Examiner
UNITED STATES PATENTS
2,591,185  4/52  Neely _____ 267—107 X
2,856,987  10/58  Lelli _____ 267—107 X ARTHUR L. LA POINT, *Primary Examiner.*